US012715796B2

(12) United States Patent
Perry et al.

(10) Patent No.: US 12,715,796 B2
(45) Date of Patent: Aug. 25, 2026

(54) PROCESS FOR REMOVING HARDNESS AND TOTAL ORGANIC CARBON FROM DRINKING WATER

(71) Applicant: Veolia Water Solutions & Technologies Support, Saint-Maurice (FR)

(72) Inventors: Thomas Perry, Holly Springs, NC (US); Harrison Fowler, Garner, NC (US)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 399 days.

(21) Appl. No.: 18/287,207

(22) PCT Filed: Apr. 12, 2022

(86) PCT No.: PCT/US2022/024349

§ 371 (c)(1),
(2) Date: Oct. 17, 2023

(87) PCT Pub. No.: WO2022/225738

PCT Pub. Date: Oct. 27, 2022

(65) Prior Publication Data

US 2024/0199454 A1 Jun. 20, 2024

Related U.S. Application Data

(60) Provisional application No. 63/176,435, filed on Apr. 19, 2021.

(51) Int. Cl.
*C02F 1/52* (2023.01)
*C02F 5/06* (2023.01)
(Continued)

(52) U.S. Cl.
CPC .............. *C02F 1/5245* (2013.01); *C02F 5/06* (2013.01); *C02F 2001/5218* (2013.01);
(Continued)

(58) Field of Classification Search
CPC .. C02F 1/5245; C02F 5/06; C02F 2001/5218; C02F 2101/203; C02F 2101/206; C02F 2101/30; C02F 2305/12; C02F 5/02
(Continued)

(56) References Cited

U.S. PATENT DOCUMENTS 5,156,746 A * 10/1992 Maree ........................ B01J 8/20
210/717
7,048,852 B2 5/2006 Ballard
(Continued)

OTHER PUBLICATIONS

Bond, R., et al., "Zero Liquid Discharge for Inland Desalination", Awwa Research Foundation, Jan. 1, 2007, pp. 1-272.
(Continued)

*Primary Examiner* — Ekandra S. Miller-Cruz
(74) *Attorney, Agent, or Firm* — COATS & BENNETT, PLLC

(57) ABSTRACT

The present invention relates to a process for reducing hardness and organic matter concentrations in water. The water being treated is directed into and through an upflow reactor containing a media. As the water moves up the reactor, the media is fluidized. At least one softening reagent is added to the water in the reactor, resulting in an increase in pH and the precipitation of hardness. The precipitated hardness compounds are attached on the media. To enhance the reduction of organic matter in the water, a coagulant is mixed with the water upstream of the softening reactor. As the water flows upwardly through the reactor, the coagulant reacts with organic particles in the water, causing the organic particles to bind and form floc. Downstream of the reactor,
(Continued)

the water is subjected to a filtration process that removes the floc containing the organic matter.

14 Claims, 1 Drawing Sheet

(51) Int. Cl.
*C02F 101/20* (2006.01)
*C02F 101/30* (2006.01)

(52) U.S. Cl.
CPC .. *C02F 2101/203* (2013.01); *C02F 2101/206* (2013.01); *C02F 2101/30* (2013.01)

(58) Field of Classification Search
USPC .......................................................... 210/600
See application file for complete search history.

(56) References Cited

U.S. PATENT DOCUMENTS

2006/0278582 A1 12/2006 Hildebrand
2020/0290909 A1 9/2020 Christy

OTHER PUBLICATIONS

Matilainen, A., et al., "Natural organic matter removal by coagulation during drinking water treatment: A review", Advances in Colloid and Interface Science, Sep. 1, 2010, pp. 189-197, vol. 159, No. 2.

Szlachta, M., et al., "Effects of natural organic matter removal by integrated processes: Alum coagulation and PAC-adsorption", Water Science & Technology, Feb. 1, 2009, pp. 1951-1957, vol. 59, No. 10.

Christensen, T., et al., "Treatment of Water with Dissolved Heavy Metals: Heavy metal adsorption in a fluidised bed technology using Fe(II) or Mn(II) Test results with As", Conference Paper, May 1, 2003, pp. 1-18.

Zaman, N., et al., "Eco-Friendly Coagulant versus Industrially Used Coagulants: Identification of Their Coagulation Performance, Mechanism and Optimization in Water Treatment Process", International Journal of Environmental Research and Public Health, Aug. 31, 2021, pp. 1-21, vol. 18, No. 17.

Veolia Water Technologies, "Softening Solutions", US Municipal Portfolio, Jan. 1, 2021, pp. 1-4, XP055937309.

* cited by examiner

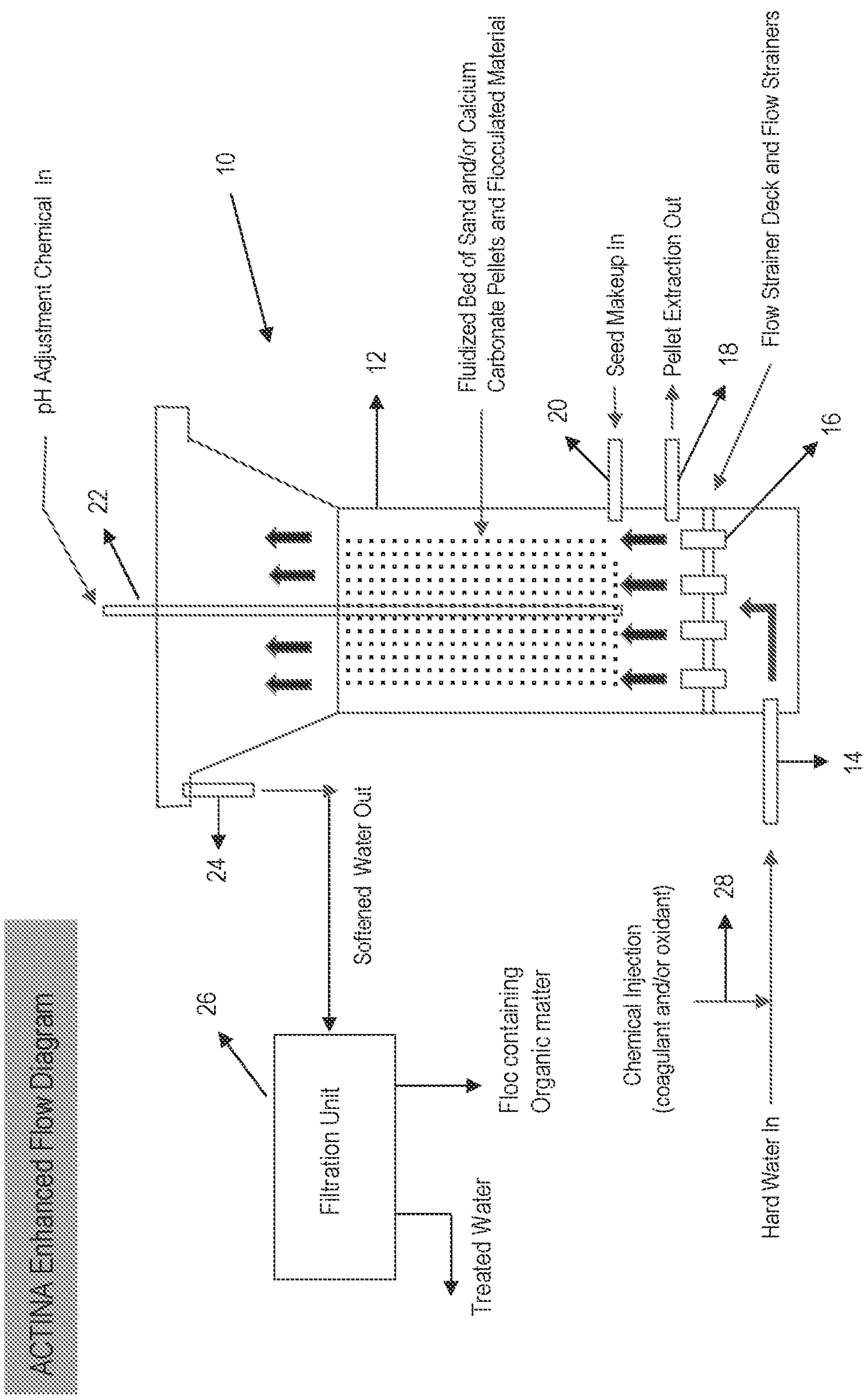
ACTINA Enhanced Flow Diagram
pH Adjustment Chemical In
10
12
22
Fluidized Bed of Sand and/or Calcium Carbonate Pellets and Flocculated Material
20
Seed Makeup In
Pellet Extraction Out
18
Flow Strainer Deck and Flow Strainers
16
14
24
Softened Water Out
26
Filtration Unit
Floc containing Organic matter
Treated Water
Chemical Injection (coagulant and/or oxidant)
28
Hard Water In

PROCESS FOR REMOVING HARDNESS AND TOTAL ORGANIC CARBON FROM DRINKING WATER

RELATED APPLICATIONS

This application claims priority from U.S. Provisional App. No. 63/176,435, filed 19 Apr. 2021, the disclosure of which is incorporated by reference herein in its entirety.

FIELD OF THE INVENTION

The present invention relates to treating drinking water, and more particularly to a process that removes hardness and total organic carbon (TOC) from the drinking water.

BACKGROUND OF THE INVENTION

In treating drinking water, it is recognized that it is important to remove hardness from the water and also to reduce the TOC concentration. The daily use of hard water that contains calcium and magnesium ions results in whitish limestone deposits most notable on glassware and shower systems. These deposits progressively clog hot water lines and can affect the proper operation of household appliances and water heaters. Chemical additives, such as detergents, sequestering agents and regenerating agents, are used to remove hardness but over time the efficiencies of these processes decrease and result in higher energy consumption.

Total organic carbon, on the other hand, is organic matter which essentially means that it is a carbon-based contaminant. Total organic carbon can contain thousands of constituents which include colloids, compounds, macroscopic particles, and dissolved molecules. All water, no matter how pure, contains carbon materials that are introduced into the water from water sources. Organic matter is also introduced sometimes from materials and systems during purification. If not reduced during the treatment of drinking water, total organic carbon is problematic. Total organic carbon reduction continues to be a challenge in water treatment but is essential for safe drinking water. The problem with TOCs starts when it is combined with chlorine to treat water. When TOC mixes with chlorine, this forms undesirable by-products, particularly haloacetic acid and trihalomethane.

SUMMARY OF THE INVENTION

The present invention relates to a process for treating drinking water and reducing the concentration of TOC, especially in influents having a TOC concentration greater than 3-mg/L. Softening the water, i.e. reducing hardness, can remove relatively small amounts (5-10%) of TOC when the initial TOC concentration is less than about 3 mg/L. But when the concentration of TOC increases, i.e. above 3 mg/L, other means of reducing the TOC concentration is required to minimize the adverse effects of disinfection by-products formed after the addition of chlorine, such as trihalomethanes and haloacetic acid.

The present invention addresses this problem by employing an enhanced coagulation process along with a softening process which is carried out in an upflow reactor. The reactor is provided with particles of fine sand or calcium carbonate which provide surface area onto which precipitated hardness compounds, such as calcium carbonate, attached. Influent water to be treated is directed into the bottom of the reactor and upwardly through the reactor, fluidizing the particles in the process. A hardness reducing reagent, such as sodium hydroxide or lime, is injected into the bottom portion of the reactor and mixed with the water. This has the effect of raising the pH of water which decreases the solubility of hardness compounds. This results in the hardness compounds precipitating from the water and being physically attached onto the fluidized particles.

To address the reduction of TOC, the present invention injects a coagulant, such as alum, into the influent upstream of the softening reactor. The coagulant mixes with the influent and as the influent water flows upwardly through the fluidized bed of particles and through the reactor, coagulation occurs. That is, the constituent of total organic carbon, including both soluble and insoluble species, are attracted and agglomerated into the particles that form floc. Hence, the organic matter is contained in the floc.

The water is discharged from the reactor and directed through a filtration process where the floc of organic material is captured and removed from the water.

Other objects and advantages of the present invention will become apparent and obvious from a study of the following description and the accompanying drawings which are merely illustrative of such invention.

BRIEF DESCRIPTION OF THE DRAWINGS

FIG. 1 is a schematic illustration of a reactor employed in the process of the present invention to soften water and to reduce the concentration of total organic carbon in the water.

DESCRIPTION OF EXEMPLARY EMBODIMENT

The present invention is a process for treating water, particularly drinking water. The process is designed to soften the water, i.e. remove calcium, magnesium and other divalent cations that contribute to hardness. Generally in this process, a substantial amount of hardness is present as calcium carbonate, which is removed in the softening process. As discussed below, the hardness precipitates onto the fluidized material during the course of treatment. Also, the process of the present invention is designed to remove or reduce the concentration of TOC, especially in drinking water influents having a TOC exceeding 3 mg/L. This is achieved by an enhanced coagulation process described below.

Referring to FIG. 1, there is shown therein a reactor indicated generally by the numeral 10. Reactor 10 is an upflow reactor meaning that during the course of treatment, the water flows from a bottom portion of the reactor upwardly through the reactor and out a top portion. Reactor 10 consists of a tank 12 and a water inlet 14. Disposed in the bottom portion of the reactor 10 is a flow strainer deck 16 that includes a plurality of flow strainers. The flow strainers function to equally distribute the flow of water through the reactor 10 to insure homogeneous fluidization of the particles or other media in the straight run of the reactor.

Also, reactor 10 includes a pellet extraction outlet 18. As will be described later, the process employs media, such as sand particles, which provide surface area for the precipitated hardness to attach. Once the hardness, such as calcium carbonate, is attached onto the media, the media is referred to as pellets. Disposed adjacent the pellet extraction outlet 18 is a seed makeup inlet 20.

At the top of the reactor, there is an elongated tube 22 used for directing a pH adjustment reagent through dispersion nozzle(s) at the bottom of the reactor. At the top of the reactor is an outlet 24 which directs the water from the reactor 10 to a filtration unit 26 which, as described below, functions to remove the floc-containing organic matter from the water.

Disposed upstream of the reactor is a coagulation injection site 28. Here, one or more coagulants or polymers are injected into the influent and mixed therewith for the purpose of coagulating constituent particles of TOC.

The process of the present invention entails loading the reactor 10 with seed which can be various forms of media, such as fine sand particles. The media, during the course of treatment, provides surface area onto with precipitated hardness can attach. Typically, the water being treated will contain hardness and various organic constituents that make up total organic carbon. Although the present invention can be used to purify various types of water, it is particularly applicable to treating drinking water. Hence, drinking water including hardness and organic matter is directed into the inlet 14 and upwardly through the reactor 10. This fluidizes the media in reactor 10. After moving through the fluidized media, the water is directed out the outlet 24 and through the filtration unit 26.

During the treatment process, a softening reagent, such as sodium hydroxide or lime, is injected into the reactor via line 22. The softening reagent, which effectively increases the pH of the water passing through the reactor, is mixed with the water. By raising the pH of the water, the solubility of hardness compounds is decreased. This causes the hardness compounds, particularly calcium carbonate, to precipitate from the water and attach onto the fluidized media. Over time, the pellets will grow in diameter as more and more precipitated material is attached. Once the pellets grow to a predetermined size a portion of the pellets are extracted via the pellet extraction outlet 18. When needed, fresh seed media is injected into the reactor 10 via seed makeup inlet 20.

Conventional softening processes are not efficient in reducing TOC concentrations by more than 15 to 20%, which can be problematic when the influent TOC concentration exceeds 3 mg/L. The inventors, in addressing the challenge of reducing TOC concentrations in influents having a TOC concentration greater than 3 mg/L, discovered that by combining coagulant addition and an effective pellet softening process the resulting process was efficient in increasing the TOC concentration reduction rates. See Table I below.

In FIG. 1 there is a coagulation injection site 28 that is provided upstream of the softening reactor 10. There are various means for mixing a coagulant with the influent water upstream of the reactor 10. In one embodiment, it is envisioned that an inline static mixer is used to mix the coagulant or coagulants with the influent water. Various coagulants or polymers can be used to coagulate the organic constituents of TOC. The commonly used metal coagulants fall into two categories: those based on aluminum and those based on iron. The aluminum coagulants include aluminum sulfate, aluminum chlorohydrate, polyaluminum chloride and aluminum aluminate. The iron coagulants include ferric sulfate, ferrous sulfate, ferric chloride and ferric chloride sulfate.

Once the coagulant has been added and mixed with the influent water, the water moves up through the reactor 10 and through the fluidized media and during this process, the coagulant reacts with various organic matter constituents that make up TOC. In some cases, the positive charge of the coagulant neutralizes the negative charge of dissolved and suspended organic particles in the water. When this occurs, the organic particles tend to bind together and coagulate. The larger particles or floc containing the organic particles can be removed in various ways including filtration.

It follows that the water discharged through outlet 24 includes floc that contains the coagulated organic particles. The water is directed through the filtration unit 26. Various types of filtration units can be employed. In one embodiment, it is contemplated that the filtration unit 26 would be a cloth media or mono/multimedia filter. That would be effective in removing the floc containing organic particles discharged from the reactor 10.

TABLE I

| Water Source | NaOH Dose (mg/l) | Lime Dose (mg/l) | ACH Dose (mg/l) | Actina Effluent pH | Influent Total Hardness (mg/l as CaCO3) | Actina Effluent Total Hardness (mg/l as CaCO3) | Influent TOC (mg/l) | TOC after Actina Effluent is filtered through 0.45 um pad (mg/l) | TOC Removal Rate |
|---|---|---|---|---|---|---|---|---|---|
| West Wells | 105 | 0 | 0 | 9.5 | 235 | 92 | 15.2 | 14.5 | 5% |
| West Wells | 80 | 0 | 50 | 8.6 | 220 | 103 | 14.1 | 7.32 | 48% |
| West Wells | 0 | 67 | 0 | 9.5 | 218 | 117 | 14.1 | 11.2 | 21% |
| West Wells | 0 | 67 | 40 | 8.3 | 216 | 112 | 13.8 | 6.81 | 51% |
| East Wells | 60 | 0 | 0 | 8.6 | 217 | 97 | 5.0 | 4.94 | 1% |
| East Wells | 60 | 0 | 40 | 8.3 | 200 | 113 | 5.4 | 3.90 | 28% |
| East Wells | 0 | 96 | 0 | 9.6 | 213 | 62 | 4.6 | 3.65 | 21% |
| East Wells | 0 | 96 | 16 | 9.5 | 214 | 64 | 5.2 | 2.94 | 43% |

Table I shows the results of eight tests conducted by the inventors using the process and reactor discussed above. Various tests were conducted when only a softening reagent, lime or sodium hydroxide, was used. These tests produced TOC concentration reductions of 1%, 5% and 21%. When the coagulant aluminum chlorohydrate was added, TOC reduction levels increased to 28%, 43%, 48%, and 51%. These TOC reduction levels resulting from coagulation are impressive, especially given the nature of the process. But there was another surprising discovery. The addition of the coagulant upstream of the reactor enhanced hardness reduction by allowing a lower pH to be maintained in the reactor 10 while achieving similar softened water hardness levels when no coagulant is added at a higher pH. This means that by adding a coagulant, the amount of the softening reagent can be reduced without sacrificing hardness removal. This also reduces the amount of acid required for the re-carbonation step that typically takes place downstream of the reactor.

The inventors also observe that during these tests the TOC reduction rates were controlled by altering the coagulant dose. This adds significant operational flexibility while treating water with varying organic loads and helps to reduce operating costs by allowing an optimum coagulant dose to be determined based on the influent and desired effluent TOC levels.

While conducting these tests, the inventors discovered that the combined processes, i.e. softening and coagulation, enhance the reduction of metals, especially iron and manganese. Iron and manganese are common concerns when treating ground water for the production of drinking water. As shown in Table II below, softening alone does reduce the concentration of iron and manganese via precipitation and attachment or adsorption onto the pellets. Note softening alone (pH adjustment only) reduces the iron concentration 65-75% while reducing the manganese concentration 85-90%. Basically, the iron and manganese attach to the pellets along with the hardness. When a coagulant is added and used in conjunction with softening, there appears to be an enhanced reduction in the concentration of iron and manganese. Now the process reduces iron and manganese through coagulation before the water enters the reactor 10, as well as through precipitation where the iron and manganese attach to the pellets.

TABLE II

| Parameter | pH Adjustment Only | pH Adjustment and Coagulant |
|---|---|---|
| Total Hardness$_{(mg/l\ CaCO3)}$ | 65 to 75% | Same but at a lower pH |
| Calcium Hardness$_{(mg/l\ CaCO3)}$ | 65 to 85% | Same but at a lower pH |
| Magnesium Hardness$_{(mg/l\ CaCO3)}$ | 10 to 40% | Same but at a lower pH |
| Total Organic Carbon$_{(mg/l)}$ | 5 to 10% with NaOH 15 to 20% with lime | 40 to 50% |
| Iron$_{(mg/l)}$ | 65 to 75% | >90% |
| Manganese$_{(mg/l)}$ | 85 to 90% | >95% (assumed) |

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A process for treating drinking water containing hardness and total organic carbon where the concentration of the total organic carbon is greater than 3 mg/L, the process comprising:

pumping the drinking water into the bottom of an upflow reactor containing sand or calcium carbonate;

pumping the drinking water upwardly through the reactor and fluidizing the sand or calcium carbonate;

reducing the hardness in the drinking water by:

a. injecting a hardness reducing reagent into the reactor and mixing the hardness reducing reagent with the drinking water passing upwardly through the reactor;

b. wherein the hardness reducing reagent increases the pH of the drinking water moving upwardly through the reactor;

c. precipitating hardness compounds from the drinking water as the drinking water moves upwardly through the reactor and through the fluidized sand or calcium carbonate;

d. attaching the precipitated hardness compounds to the sand or calcium carbonate to form pellets in the reactor;

e. from time-to-time, removing at least some of the pellets from the reactor;

removing constituents of the total organic carbon from the drinking water by:

a. mixing a coagulant with the drinking water at a point upstream of the reactor;

b. as the drinking water moves upwardly through the fluidized sand or calcium carbonate, coagulation occurs and as a result, the constituents of the total organic carbon, including both soluble and insoluble species, are attracted and agglomerate into particles that form floc;

directing the drinking water from the reactor;

when the drinking water exits the reactor, subjecting the drinking water to a filtration process that removes the floc containing the constituents of the total organic carbon; and wherein the drinking water also contains iron and manganese and the process reduces both iron and manganese through coagulation before the drinking water enters the reactor and further removes iron and manganese through precipitation as the drinking water moves upwardly through the reactor and by a process where the iron and manganese precipitants attach to the pellets.

2. The process of claim 1 including removing at least 35% of the total organic carbon from the drinking water.

3. The process of claim 1 wherein the method of removing hardness and constituents of total organic carbon is carried out in the absence of a flocculation tank.

4. The process of claim 1:

wherein the upflow reactor includes a straight run that extends from the bottom of the upflow reactor to the top of the upflow reactor;

after pumping the drinking water into the bottom of the upflow reactor, pumping the water upwardly from the bottom of the reactor through a flow strainer deck that includes a plurality of flow strainers disposed across the bottom portion of the upflow reactor; and wherein the flow strainers equally distribute the flow of drinking water through the upflow reactor to insure homogeneous fluidization of the sand and calcium carbonate.

5. The process of claim 4 wherein the process is carried out in the upflow reactor without the use of mechanical agitation.

6. The process of claim 1 wherein the reactions giving rise to the precipitation of the hardness compounds, the attaching of the hardness compounds to the sand or calcium carbonate to form pellets as well said coagulation and the constituents of the total organic carbon attaching and agglomerating into particles that form floc all occur in the upflow reactor.

7. The process of claim 6 wherein said reactions all occur in the upflow reactor without the aid of any mechanical agitation.

8. A process for treating drinking water containing hardness and total organic carbon where the concentration of the total organic carbon is greater than 3 mg/L, the process comprising:

loading an upflow reactor with a media in the form of particles of sand or calcium carbonate having surface areas;

pumping the drinking water into the bottom of the upflow reactor;

pumping the drinking water upwardly through the reactor and fluidizing the particles of sand or calcium carbonate;

reducing the hardness in the drinking water by:

a. injecting a hardness reducing reagent into the reactor and mixing the hardness reducing reagent with the drinking water passing upwardly through the reactor;

b. wherein the hardness reducing reagent increases the pH of the drinking water moving upwardly through the reactor;

c. precipitating hardness compounds from the drinking water as the drinking water moves upwardly through the reactor and through the fluidized sand or calcium carbonate;

d. attaching the precipitated hardness compounds to the surface area of the particles of sand or calcium carbonate to form pellets in the reactor;

e. removing at least some of the pellets from the reactor;

removing constituents of the total organic carbon from the drinking water by:

a. mixing a coagulant with the drinking water at a point upstream of the reactor;

b. as the drinking water moves upwardly through the fluidized sand or calcium carbonate, coagulation occurs and as a result, the constituents of the total organic carbon, including both soluble and insoluble species, are attracted and agglomerate into particles that form floc;

directing the drinking water from the reactor; and when the drinking water exits the reactor, subjecting the drinking water to a filtration process that removes the floc containing the constituents of the total organic carbon.

9. The process of claim 8 including removing at least 35% of the total organic carbon from the drinking water.

10. The process of claim 8 wherein the method of removing hardness and constituents of total organic carbon is carried out in the absence of a flocculation tank.

11. The process of claim 8:

wherein the upflow reactor includes a straight run that extends from the bottom of the upflow reactor to the top of the upflow reactor;

after pumping the drinking water into the bottom of the upflow reactor, pumping the water upwardly from the bottom of the reactor through a flow strainer deck that includes a plurality of flow strainers disposed across the bottom portion of the upflow reactor; and wherein the flow strainers equally distribute the flow of drinking water through the upflow reactor to insure homogeneous fluidization of the sand and calcium carbonate.

12. The process of claim 11 wherein the process is carried out in the upflow reactor without the use of mechanical agitation.

13. The process of claim 8 wherein the reactions giving rise to the precipitation of the hardness compounds, the attaching of the hardness compounds to the sand or calcium carbonate to form pellets as well said coagulation and the constituents of the total organic carbon attaching and agglomerating into particles that form floc all occur in the upflow reactor.

14. The process of claim 13 wherein said reactions all occur in the upflow reactor without the aid of any mechanical agitation.

* * * * *